US010423852B1

(12) United States Patent
Sarraf

(10) Patent No.: US 10,423,852 B1
(45) Date of Patent: Sep. 24, 2019

(54) TEXT IMAGE PROCESSING USING WORD SPACING EQUALIZATION FOR ICR SYSTEM EMPLOYING ARTIFICIAL NEURAL NETWORK

(71) Applicant: KONICA MINOLTA LABORATORY U.S.A., INC., San Mateo, CA (US)

(72) Inventor: Saman Sarraf, Belmont, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 38 days.

(21) Appl. No.: 15/926,966

(22) Filed: Mar. 20, 2018

(51) Int. Cl.

| | |
|---|---|
| ***G06K 9/34*** | (2006.01) |
| ***G06K 9/62*** | (2006.01) |
| ***G06K 9/18*** | (2006.01) |
| ***G06K 9/00*** | (2006.01) |
| ***G06K 9/48*** | (2006.01) |
| ***G06K 9/72*** | (2006.01) |
| ***G06N 3/08*** | (2006.01) |

(52) U.S. Cl.
CPC ............... *G06K 9/348* (2013.01); *G06K 9/18* (2013.01); *G06K 9/6215* (2013.01); *G06N 3/08* (2013.01); *G06K 2209/01* (2013.01)

(58) Field of Classification Search
CPC ............... G06F 17/277; G06F 17/2785; G06F 16/3329; G06F 16/3347; G06F 17/2715
USPC ....... 358/177, 186, 187, 258, 198, 185, 229, 358/156; 704/270.1, 3
See application file for complete search history.

(56) References Cited

U.S. PATENT DOCUMENTS

| | | | | |
|---|---|---|---|---|
| 5,633,954 | A * | 5/1997 | Gupta | G06K 9/3283 382/187 |
| 9,014,481 | B1 * | 4/2015 | Luqman | G06K 9/481 382/185 |
| 10,002,301 | B1 * | 6/2018 | Mahmoud | G06F 3/018 |
| 2018/0137350 | A1 * | 5/2018 | Such | G06K 9/00463 |
| 2019/0180154 | A1 * | 6/2019 | Orlov | G06K 9/72 |

OTHER PUBLICATIONS

Graves, “Generating sequences with recurrent neural networks”, arXiv preprint arXiv:1308.0850, 2013.
Alexgraves, “RNNLIB”, https://sourceforge.net/p/rnnl/wiki/Home/, SourceForge, last updated Oct. 22, 2017, 9 pages, printed from the Internet on May 22, 2018.

* cited by examiner

*Primary Examiner* — Charlotte M Baker
(74) *Attorney, Agent, or Firm* — Chen Yoshimura LLP

(57) ABSTRACT

In an intelligent character recognition (ICR) method for recognizing hand-written text images using a long-short term memory (LSTM) recurrent neural network (RNN), text images are segmented into text line images, and the text lines images are pre-processed to normalize the line height and to equalize the word spacings in each text line. Both training images used to train the RNN network and test images containing text to be recognized by the trained RNN network are pre-processed to have identical heights and identical word spacings between words. This method improves character recognition accuracy.

12 Claims, 3 Drawing Sheets

Input text image (color, grayscale, or binary image containing hand-written text)

S11: Binarize text image

S12: Perform line segmentation on text image to generate text line images

S13: Perform line height normalization for each text line image

For each text line image:
S14: Calculate vertical projection

S15: Extract zero blocks and non-zero blocks based on vertical projection

S16: Divide zero blocks into a longer and a shorter subset, and designate longer zero blocks as word spacings S17: Equalize all word spacings Pre-processed text line images LSTM network model (training, or prediction)

Trained network model, or prediction result

TEXT IMAGE PROCESSING USING WORD SPACING EQUALIZATION FOR ICR SYSTEM EMPLOYING ARTIFICIAL NEURAL NETWORK

BACKGROUND OF THE INVENTION

Field of the Invention

This invention relates to text image processing, and in particular, it relates to a text image processing method used in conjunction with an artificial neural network to perform intelligent character recognition (ICR) to digitalize hand-written text.

Description of Related Art

There is significant interest in applying recurrent neural networks (RNN), such as long short-term memory networks (LSTM), in intelligent character recognition (ICR) systems for hand-written text digitalization. In some applications using RNN neural network for character recognition of hand-written text, text images are segmented into text lines and then into individual words, and word images each containing one word are inputted to the RNN network model, both for training the network model and for performing prediction (character recognition).

SUMMARY

In some ICR technologies, word segmentation tasks are challenging due to random spaces between words in a given text line. For the same reason, training an RNN network using line-level samples, i.e. text line images each containing one line of text, is often unsuccessful as automatic labeling algorithms such as connectionist temporal classification (CTC) often fail to correctly find correct lengths of spaces between words.

Accordingly, the present invention is directed to a text image processing method that substantially obviates one or more of the problems due to limitations and disadvantages of the related art.

An object of the present invention is to provide a method to pre-process text line images to reduce the effect of variable word spacings on network training and prediction process, thereby improving recognition accuracy for an ICR system that employs an RNN.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve the above objects, the present invention provides a hand-written text character recognition method using an artificial neural network, which includes: obtaining training data containing a plurality of training text line images and corresponding label data, each training text line image being a binary image containing one line of hand-written text, the label data containing digital values representing characters contained in each training text line image; normalizing a height of each training text line image to a pre-determined standard line height, the standard line height being identical for all training text line images; performing word spacing equalization for each training text line image to generate a corresponding pre-processed training text line image, including: identifying a plurality of word spacings in the training text line images; and modifying the training text line image to change all word spacings to a pre-determined standard length, without changing any areas of the training text line image between adjacent word spacings, to generate the pre-processed training text line image, the standard length being identical for all training text line images; and training an untrained long-short term memory (LSTM) neural network using the pre-processed training text line images and the label data to obtain a trained LSTM neural network.

In another aspect, the present invention provides a hand-written text character recognition method using an artificial neural network, which includes: obtaining a test text line image, the test text line image being a binary image containing one line of hand-written text; normalizing a height of the test text line image to a pre-determined standard line height; performing word spacing equalization for the test text line image to generate a pre-processed test text line image, including: identifying a plurality of word spacings in the test text line images; and modifying the test text line image to change all word spacings to a pre-determined standard length, without changing any areas of the test text line image between adjacent word spacings, to generate the pre-processed test text line image; and processing the pre-processed test text line image using a trained long-short term memory (LSTM) neural network to recognize characters contained in the test text line image.

In other aspects, the present invention provides a computer program product comprising a computer usable non-transitory medium (e.g. memory or storage device) having a computer readable program code embedded therein for controlling a data processing apparatus (e.g. a computer, processor, etc.), the computer readable program code configured to cause the data processing apparatus to execute the above methods.

It is to be understood that both the foregoing general description and the following detailed description are exemplary and explanatory and are intended to provide further explanation of the invention as claimed.

DETAILED DESCRIPTION OF PREFERRED EMBODIMENTS

Embodiments of the present invention provide an image processing method which pre-processes text line images to equalize the lengths of word spacings (the blank spaces between words) in the text lines, before inputting the modified text line images into a recurrent neural network (RNN) for character recognition (for both network model training and character recognition prediction). The method does not require any modifications to the neural network model that is used for character recognition. The method is primarily intended to be applied to images containing hand-written text. By applying the word-spacing equalization technique on the input text line images, embodiments of the present invention can improve hand-written character recognition accuracy and/or improve performance.

A recurrent neural network (RNN) is a type of artificial neural network where the network nodes are connected in a cycle. A recurrent neural network may be constructed by integrating a chunk of neural network in the cell of the RNN with $x_t$ (a time series) as input to the cell and $h_t$ (a time series) as output. Long short-term memory (LSTM) blocks are a popular choice for the RNN cell in many applications, and the resulting network is referred to as an LSTM network. The cell allows information to be passed from the current time step t to the next time step t+1. Therefore, information from many steps in the past is used to generate the output of the current step. LSTM networks are well known in the art, and have been used to perform character recognition for text digitization. See, for example, Graves, Alex. "Generating sequences with recurrent neural networks," arXiv preprint arXiv:1308.0850 (2013). One example of an LSTM network model that may be used for character recognition may be obtained from https://sourceforge.net/p/rnnl/wiki/Home/. This is an implementation of LSTM in c++. Based on available literature, those skilled in the art will be able to obtain or construct an RNN useful for implementing the present invention; therefore, no further detailed description of the RNN or LSTM will be provided in this disclosure. Embodiments of the present invention can be used with any suitable RNN model, including those currently available and those that may be developed in the future.

Figure 1:
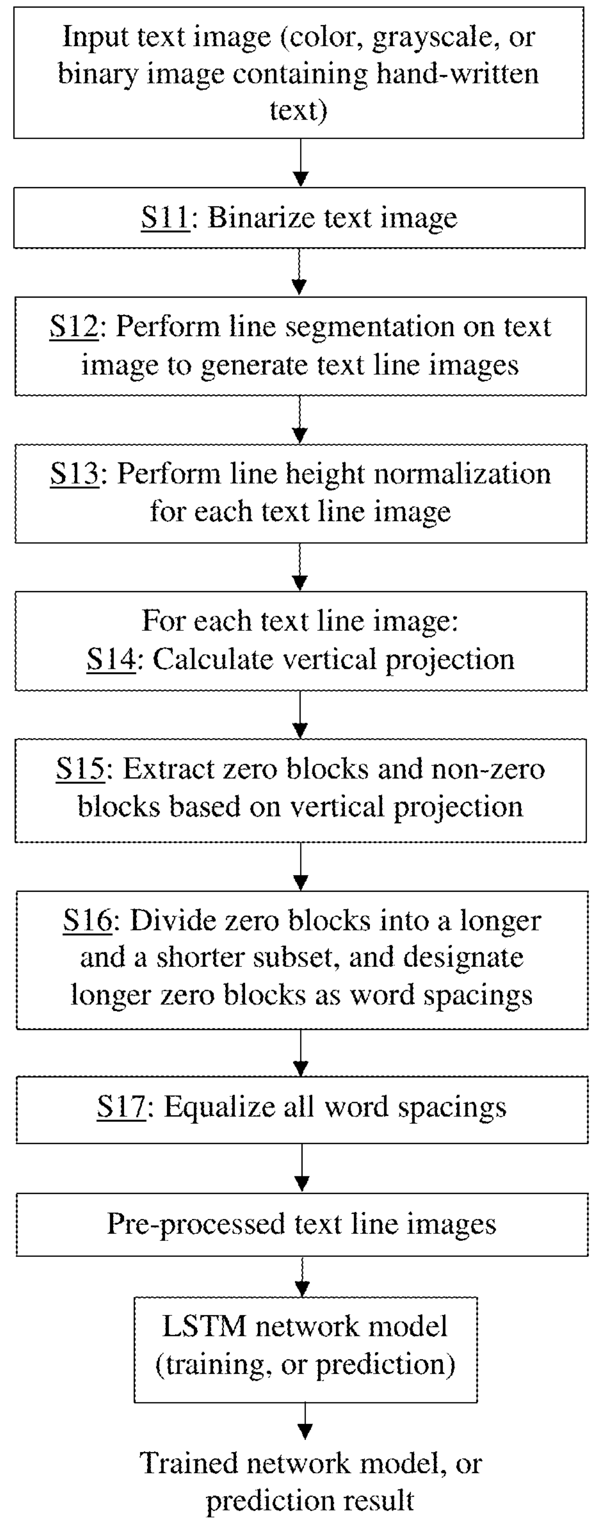
FIG. 1 schematically illustrates a method of pre-processing images containing hand-written text and inputting the pre-processed images into a recurrent neural network (RNN) for network model training and prediction according to embodiments of the present invention.

Referring to FIG. 1, the pre-processing steps S11 to S17 are applied to each input text image. The input text image contains multiple lines of hand-written text, and may be a color image, a grayscale image, or a binary image. The input text image may be either an image in a training dataset used for training the network model (referred to as a training image), or an image containing text to be recognized (referred to as a test image). The input text image is first binarized (step S11), unless it is already a binary image. Then, line segmentation is performed on the binary text image to segment it into multiple binary text line images each containing one line of text (step S12).

The binarization step S11 may use any appropriate image binarization technique. In one exemplary implementation, the binarization step S11 includes the following steps. First, a spatial filter, such as a nonlinear digital-median filter, is applied to the image to remove noises, such as scattered spots, from the input image. Then, if the image is in a color format, it is converted to a grayscale format. The grayscale image is then converted to a binary image using a dynamic thresholding method such as Otsu's method for binarization. The result is a binary text image where the pixel value of each pixel is either a background value (corresponding to spaces) or a foreground value (corresponding to text). In the descriptions below, the background value (typically white) is 0 and the foreground value (typically black) is 1, but those skilled in the art can easily adapt the method for a representation where the background value is 1 and the foreground value is 0.

The line segmentation step S12 may use any appropriate line segmentation technique. In one exemplary implementation, the line segmentation step S12 includes the following steps. First, a horizontal projection of the binary image is calculated. More specifically, for each horizontal pixel line located at a given vertical pixel position, the sum of pixel values of all pixels of that horizontal line is calculated. The horizontal projection is the curve of the sum vs. vertical pixel position. Based on the horizontal projection, zero blocks of the text image, i.e., blocks corresponding to consecutive vertical pixel positions that have sum values less than or equal to a predefined threshold (for example, 0, or 5), and non-zero blocks, i.e., blocks corresponding to consecutive vertical pixel positions that have sum values greater than the predefined threshold, are extracted. This may be done, for example, by sliding a window having the length of one pixel starting from the beginning of the projection, moving by one pixel per step to the end of the projection, to capture the positions of zero values. The zero blocks generally correspond to blank spaces between text lines and the non-zero blocks generally correspond to text lines. Based on the extracted zero blocks and non-zero blocks in the horizontal projection, text line positions in the image are extracted, and the image is segmented into multiple test line images each containing one line of text.

Figures 2A, 2B:
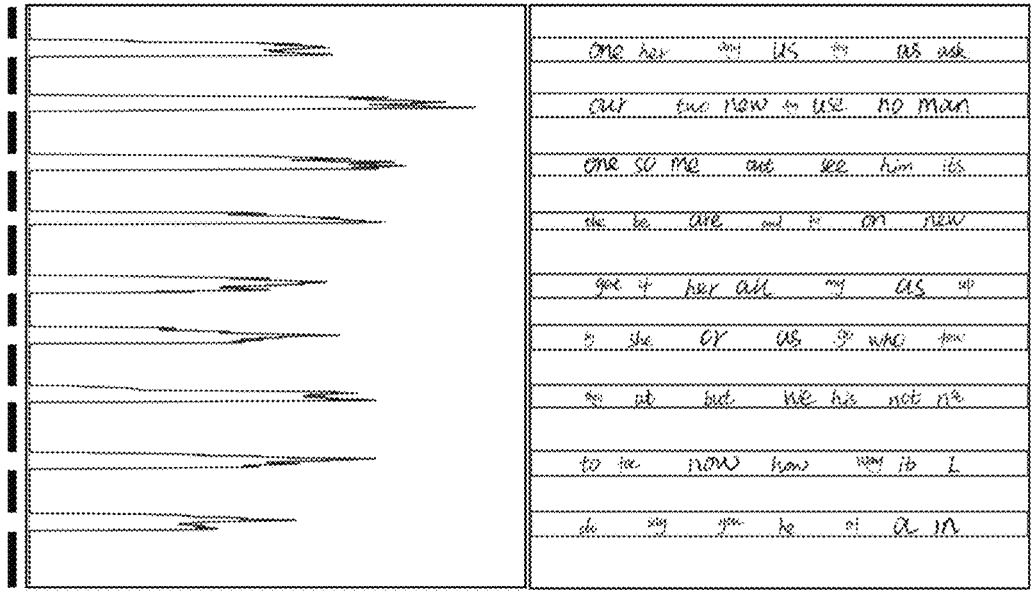
FIG. 2A illustrates an example of line segmentation according to an embodiment of the present invention.
FIG. 2B illustrates an example of the effect of line height normalization according to an embodiment of the present invention.
Figure 2C:
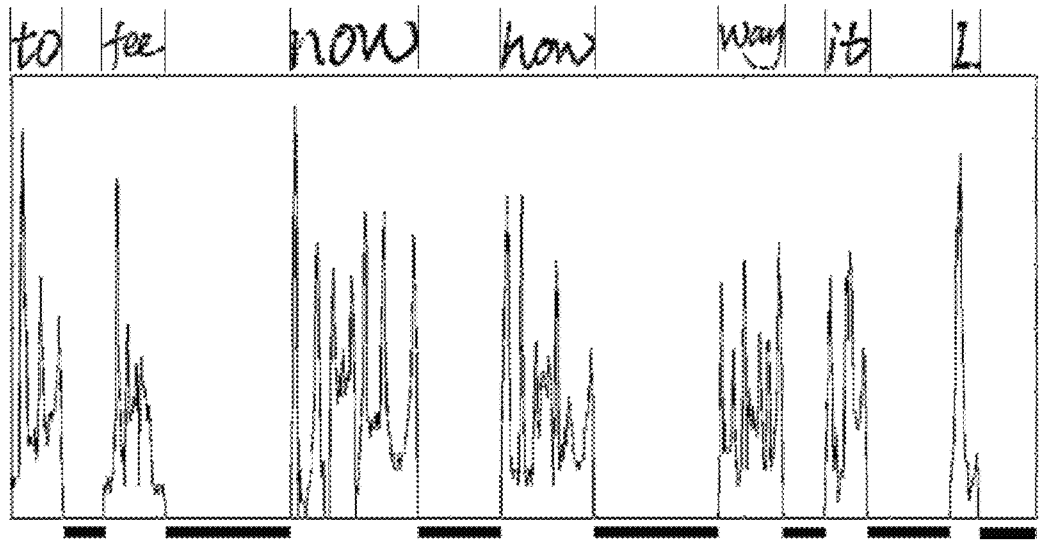
FIGS. 2C and 2D illustrate an example of word spacing equalization according to an embodiment of the present invention.
Figure 2D:
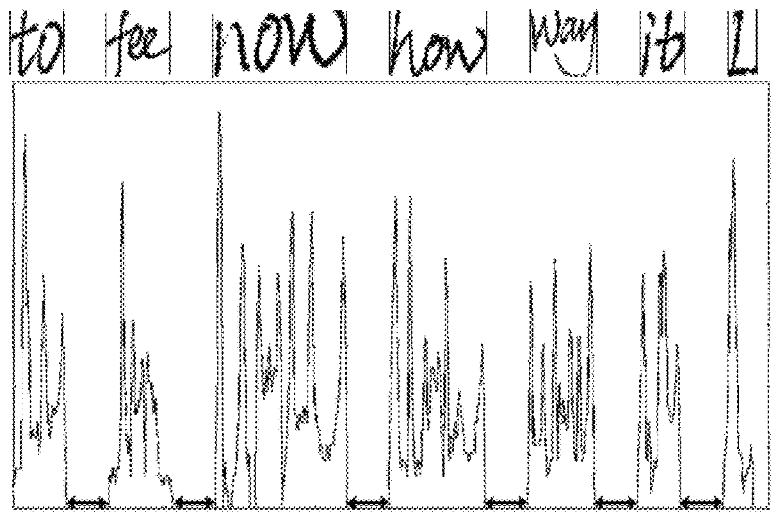

FIG. 2A illustrates an example of line segmentation, showing a text image on the right and a corresponding horizontal projection on the left. The thick black lines to the left of the horizontal projection graph indicates the locations of the zero blocks corresponding to blank spaces between text lines. The boxes overlapped on the text image depict the resulting text line images.

Referring back to FIG. 1, the height of each text line image generated in step S12 is normalized to a pre-determined standard line height (step S13). The standard line height, which is identical for all text lines in all training images and test images, may be a selected constant value, such as 64 or 48 pixels. Alternatively, the standard line height may be calculated by taking an average of text line heights from one or more randomly selected training images, and used for all lines for all training images and test images. The height normalization in step S12 may be done by linear or non-linear interpolation of the original text line image. FIG. 2B illustrates an example of the effect of line height normalization.

Referring back to FIG. 1, steps S14-S17 perform word spacing equalization for each text line image. First, a vertical projection for the text line image is calculated (step S14). More specifically, for each vertical pixel line located at a given horizontal pixel position, the sum of pixel values of all pixels of that vertical line is calculated. The vertical projection is the curve of the sum vs. horizontal pixel position. Based on the vertical projection, zero blocks of the text line image, i.e., blocks corresponding to consecutive horizontal pixel positions that have sum values less than or equal to a predefined threshold (for example, 0, or 1), and non-zero blocks, i.e., blocks corresponding to consecutive horizontal pixel positions that have sum values greater than the predefined threshold, are extracted (step S15). Each zero and non-zero block is an image block that spans the height of the line. The zero blocks generally correspond to blank spaces between text characters and blank spaces between words. The zero blocks are divided into two subsets based on their lengths (number of consecutive pixel positions), where each block in the second ("longer") subset is longer than each block in the first ("shorter") subset, and the subset of longer zero block are designated as word spacings while the subset of shorter ones are deemed character spacings (step S16). In one embodiment, the division uses a predefined threshold, and zero blocks having lengths greater than the predefined threshold (e.g., 20 pixels, or 30 pixels) are designated as word spacings (and the other ones as character spacings). In an alternative embodiment, the zero blocks of the text line image are classified into two classes based on their lengths, namely a class of longer zero blocks and a class of shorter zero blocks, for example by using k-means clustering, and the class of longer zero blocks are designated as word spacings. In another alternative embodiment, all zero blocks extracted from one or more randomly selected training images are classified into two classes based on their lengths, and a value that divides the longer classes and the shorter class is taken as the pre-defined threshold to divide the zero blocks for each text line image.

Then, the text line image is modified so that all word spacings in the modified image have a pre-determined standard length, which is identical for all word spacings of all text lines (step S17). This may be done by adding blank spaces to word spacings that are shorter than the standard length and removing blank spaces from word spacings that are longer than the standard length. The image areas located between adjacent word spacings, which correspond to words, are not modified. The pre-determined standard length for word spacings may be a selected constant value, such as 64 pixels, or 48 pixels, etc. Alternatively, the pre-determined standard length may be calculated by taking an average of word spacings from one or more randomly selected training images, and used for all lines in the training images and test images.

FIGS. 2A and 2B illustrate an example of word spacing equalization. FIG. 2A shows an example of a vertical projection curve, with thick black lines below the vertical projection graph indicating the locations of the zero blocks that are designated as word spacings. The corresponding text line is depicted above the graph. FIG. 2B shows the modified text line image and modified vertical projection, with the arrows depicting the modified word spacings which are now equal.

This concludes the image pre-processing. The result of the pre-processing is text line images which all have the standard line height and in which all word spacings have the standard length.

It should be noted that it is also possible to perform the line height normalization step S13 after the word spacing equalization steps S14-S17.

The pre-processing steps S11 to S17 are performed for all training images and test images. All parameters used in the pre-processing, including the various thresholds, the standard line height and the standard word spacing length, are the same for training images and test images. The pre-processed training text line images are inputted to an untrained RNN network model to train the network model. The pre-processed test text line images are inputted to the so-trained network model to perform character recognition (prediction). As is generally known in the art of artificial neural networks, training of a network model includes feeding a large amount of labeled training data, in this case pre-processed text line images labeled with digital values representing the characters contained in the text line images, to the untrained network model to compute the weights of the network model. Performing prediction includes inputting the data to be processed, in this case text line images to be recognized, into the trained network to obtain prediction output, in this case the digital values of the characters in the text line images. As noted earlier, embodiments of the present invention use pre-processed text line images as input to the LSTM network model for both training and prediction, but do not require any modification of the LSTM network or its training algorithm.

The method according to embodiments of the present invention has the following advantages. First, it can improve recognition accuracy compared to a method that does not use word spacing equalization. The inventor of this application has performed a comparison of the method shown in FIG. 1 and described above with a control method that is otherwise similar to the above method but omits the word spacing equalization steps S14-S17 in both training and prediction. It was shown that the method that uses word spacing equalization improved sequence-level accuracy rate of the prediction by up to 8%, and also improved the edit distance accuracy rate. Thus, the method can reduce the error of spacing in the training and prediction phases and increase robustness of the model. Unlike in some other methods, a post processing step is not required.

Second, compared to an RNN training and prediction method that uses segmented word images (each containing only one word) as input to the RNN, using text line images as input to the RNN can omit the word segmentation step, and avoid negative impact of word segmentation on the RNN model due word segmenting failures or inaccuracies. Moreover, using text line images, as opposed to word images, as input improves speed of the entire process by reducing the number of times the RNN model is called.

The above-described image processing method may be implemented in a data processing system such as one or more computers. Each computer may comprise a processor, a memory or storage device (e.g. hard disk drive, flash memory), and internal memories (e.g. a RAM). The storage device stores computer-readable program code, which can be read out to the RAM and executed by the processor to carry out the methods. The pre-processing steps S11-S17 and the RNN model may be implemented on the same computer or different computers. In practice, artificial neural network models are often implemented using specialized processors such as GPU (graphics processing unit) clusters.

In one aspect, the invention is a method carried out by a data processing system. In another aspect, the invention is a computer program product embodied in computer usable non-transitory memory having a computer readable program code embedded therein for controlling a data processing apparatus to carry out the method. In another aspect, the invention is embodied in a data processing system.

It will be apparent to those skilled in the art that various modification and variations can be made in the text image processing method and related apparatus of the present invention without departing from the spirit or scope of the invention. Thus, it is intended that the present invention cover modifications and variations that come within the scope of the appended claims and their equivalents.

What is claimed is:

1. A hand-written text character recognition method using an artificial neural network, comprising:

obtaining training data containing a plurality of training text line images and corresponding label data, each training text line image being a binary image containing one line of hand-written text, the label data containing digital values representing characters contained in each training text line image;

normalizing a height of each training text line image to a pre-determined standard line height, the standard line height being identical for all training text line images;

performing word spacing equalization for each training text line image to generate a corresponding pre-processed training text line image, including:

identifying a plurality of word spacings in the training text line images; and modifying the training text line image to change all word spacings to a pre-determined standard length, without changing any areas of the training text line image between adjacent word spacings, to generate the pre-processed training text line image, the standard length being identical for all training text line images; and training an untrained long-short term memory (LSTM) neural network using the pre-processed training text line images and the label data to obtain a trained LSTM neural network.

2. The method of claim 1, wherein the step of obtaining the training data includes:

obtaining a plurality of training text images, each training text image being a binary image containing a plurality of lines of hand-written text; and segmenting each training text image into a plurality of training text line images, each training text line image containing one line of hand-written text.

3. The method of claim 1, wherein the step of identifying a plurality of word spacings in the training text line images comprises:

calculating a vertical projection for the training text line image, by calculating a sum of pixel values of all pixels on a vertical pixel line of the training text line image located at each horizontal pixel position, the vertical projection being a curve of the sum vs. the horizontal pixel position;

based on the vertical projection for the training text line image, extracting zero blocks and non-zero blocks of the training text line image, the zero blocks being blocks corresponding to consecutive horizontal pixel positions that have sum values less than or equal to a predefined threshold, and the non-zero blocks being blocks corresponding to consecutive horizontal pixel positions that have sum values greater than the predefined threshold; and dividing the zero blocks into a first subset and a second subset based on their lengths, each zero block in the second subset being longer than each zero block in the first subset, and designating the zero blocks in the second subset as the word spacings.

4. The method of claim 1, further comprising:

obtaining a test text line image, the test text line image being a binary image containing one line of hand-written text;

normalizing a height of the test text line image to the pre-determined standard line height;

performing word spacing equalization for the test text line image to generate a pre-processed test text line image, including:

identifying a plurality of word spacings in the test text line images; and modifying the test text line image to change all word spacings to the pre-determined standard length, without changing any areas of the test text line image between adjacent word spacings, to generate the pre-processed test text line image; and processing the pre-processed test text line image using the trained LSTM neural network to recognize characters contained in the test text line image.

5. The method of claim 4, wherein the step of identifying a plurality of word spacings in the test text line images comprises:

calculating a vertical projection for the test text line image, by calculating a sum of pixel values of all pixels on a vertical pixel line of the test text line image located at each horizontal pixel position, the vertical projection being a curve of the sum vs. the horizontal pixel position;

based on the vertical projection for the test text line image, extracting zero blocks and non-zero blocks of the test text line image, the zero blocks being blocks corresponding to consecutive horizontal pixel positions that have sum values less than or equal to a predefined threshold, and the non-zero blocks being blocks corresponding to consecutive horizontal pixel positions that have sum values greater than the predefined threshold; and dividing the zero blocks into a first subset and a second subset based on their lengths, each zero block in the second subset being longer than each zero block in the first subset, and designating the zero blocks in the second subset as the word spacings.

6. A hand-written text character recognition method using an artificial neural network, comprising:

obtaining a test text line image, the test text line image being a binary image containing one line of hand-written text;

normalizing a height of the test text line image to a pre-determined standard line height;

performing word spacing equalization for the test text line image to generate a pre-processed test text line image, including:

identifying a plurality of word spacings in the test text line images; and modifying the test text line image to change all word spacings to a pre-determined standard length, without changing any areas of the test text line image between adjacent word spacings, to generate the pre-processed test text line image; and processing the pre-processed test text line image using a trained long-short term memory (LSTM) neural network to recognize characters contained in the test text line image.

7. The method of claim 6, wherein the step of identifying a plurality of word spacings in the test text line images comprises:

calculating a vertical projection for the test text line image, by calculating a sum of pixel values of all pixels on a vertical pixel line of the test text line image located at each horizontal pixel position, the vertical projection being a curve of the sum vs. the horizontal pixel position;

based on the vertical projection for the test text line image, extracting zero blocks and non-zero blocks of the test text line image, the zero blocks being blocks corresponding to consecutive horizontal pixel positions that have sum values less than or equal to a predefined threshold, and the non-zero blocks being blocks corresponding to consecutive horizontal pixel positions that have sum values greater than the predefined threshold; and dividing the zero blocks into a first subset and a second subset based on their lengths, each zero block in the second subset being longer than each zero block in the first subset, and designating the zero blocks in the second subset as the word spacings.

8. A computer program product comprising a non-transitory computer readable memory device having a computer readable program code embedded therein for controlling a data processing apparatus, the computer readable program code configured to cause the data processing apparatus to execute a text character recognition process, the process comprising:

receiving training data containing a plurality of training text line images and corresponding label data, each training text line image being a binary image containing one line of hand-written text, the label data containing digital values representing characters contained in each training text line image;

normalizing a height of each training text line image to a pre-determined standard line height, the standard line height being identical for all training text line images;

performing word spacing equalization for each training text line image to generate a corresponding pre-processed training text line image, including:

identifying a plurality of word spacings in the training text line images; and modifying the training text line image to change all word spacings to a pre-determined standard length, without changing any areas of the training text line image between adjacent word spacings, to generate the pre-processed training text line image, the standard length being identical for all training text line images; and training an untrained long-short term memory (LSTM) neural network using the pre-processed training text line images and the label data to obtain a trained LSTM neural network.

9. The computer program product of claim 8, wherein the step of obtaining training data includes:

obtaining a plurality of training text images, each training text image being a binary image containing a plurality of lines of hand-written text; and segmenting each training text image into a plurality of training text line images, each training text line image containing one line of hand-written text.

10. The computer program product of claim 8, wherein the step of identifying a plurality of word spacings in the training text line images comprises:

calculating a vertical projection for the training text line image, by calculating a sum of pixel values of all pixels on a vertical pixel line of the training text line image located at each horizontal pixel position, the vertical projection being a curve of the sum vs. the horizontal pixel position;

based on the vertical projection for the training text line image, extracting zero blocks and non-zero blocks of the training text line image, the zero blocks being blocks corresponding to consecutive horizontal pixel positions that have sum values less than or equal to a predefined threshold, and the non-zero blocks being blocks corresponding to consecutive horizontal pixel positions that have sum values greater than the predefined threshold; and dividing the zero blocks into a first subset and a second subset based on their lengths, each zero block in the second subset being longer than each zero block in the first subset, and designating the zero blocks in the second subset as the word spacings.

11. The computer program product of claim 8, wherein the process further comprises:

obtaining a test text line image, the test text line image being a binary image containing one line of hand-written text;

normalizing a height of the test text line image to the pre-determined standard line height;

performing word spacing equalization for the test text line image to generate a pre-processed test text line image, including:

identifying a plurality of word spacings in the test text line images; and modifying the test text line image to change all word spacings to the pre-determined standard length, without changing any areas of the test text line image between adjacent word spacings, to generate the pre-processed test text line image; and processing the pre-processed test text line image using the trained LSTM neural network to recognize characters contained in the test text line image.

12. The computer program product of claim 11, wherein the step of identifying a plurality of word spacings in the test text line images comprises:

calculating a vertical projection for the test text line image, by calculating a sum of pixel values of all pixels on a vertical pixel line of the test text line image located at each horizontal pixel position, the vertical projection being a curve of the sum vs. the horizontal pixel position;

based on the vertical projection for the test text line image, extracting zero blocks and non-zero blocks of the test text line image, the zero blocks being blocks corresponding to consecutive horizontal pixel positions that have sum values less than or equal to a predefined threshold, and the non-zero blocks being blocks corresponding to consecutive horizontal pixel positions that have sum values greater than the predefined threshold; and dividing the zero blocks into a first subset and a second subset based on their lengths, each zero block in the second subset being longer than each zero block in the first subset, and designating the zero blocks in the second subset as the word spacings.

* * * * *